(No Model.) 2 Sheets—Sheet 2.

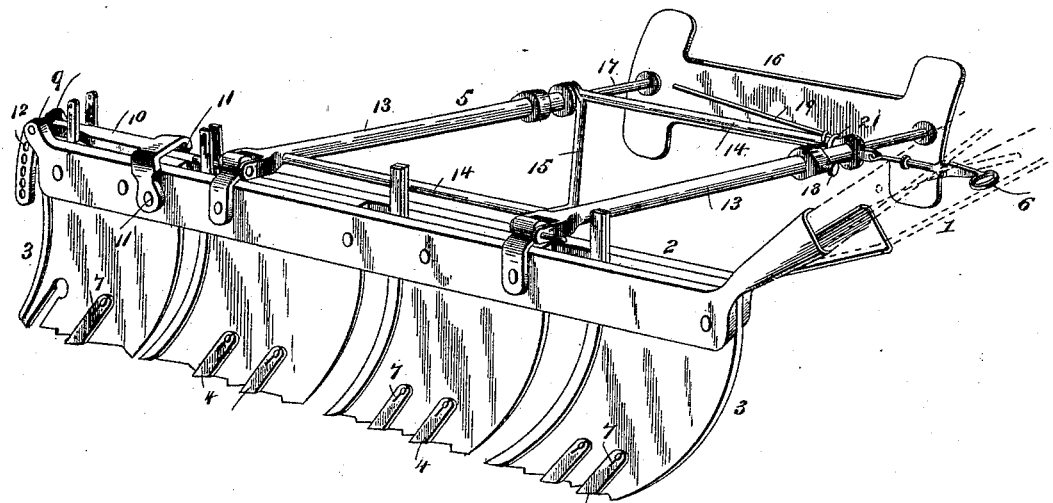

H. BODENSTEIN.
ICE CUTTER OR PLOW.

No. 449,516. Patented Mar. 31, 1891.

United States Patent Office.

HENRY BODENSTEIN, OF STAATSBURG, NEW YORK.

ICE CUTTER OR PLOW.

SPECIFICATION forming part of Letters Patent No. 449,516, dated March 31, 1891.

Application filed June 26, 1890. Serial No. 356,851. (No model.)

*To all whom it may concern:*

Be it known that I, HENRY BODENSTEIN, a citizen of the United States, residing at Staatsburg, in the county of Dutchess and State of New York, have invented certain new and useful Improvements in Ice Cutters or Plows; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in ice cutters or plows; and the leading object of my invention is a provision of an improved guide or marker adapted to be swung to either side of the plow and which can be adjusted to mark any desired size of blocks of ice.

A further object is the provision of improved cutters which will be lighter and thinner than those heretofore made and which will cut the ice more quickly and effectively than heretofore; and, finally, the object of my invention is to improve the plow in other details and render the same thoroughly efficient in operation, strong and durable, and inexpensive of production.

To attain the desired objects my invention consists in the improved construction, combination, and adaptation of parts comprising the plow, substantially as herein illustrated, described, and specifically defined and distinguished by the claims.

Figure 3:
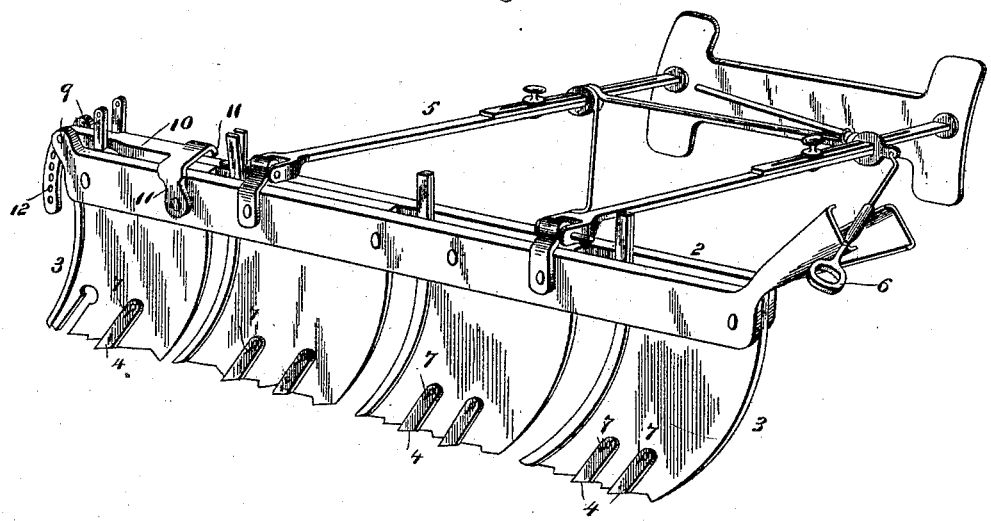
Figure 4:
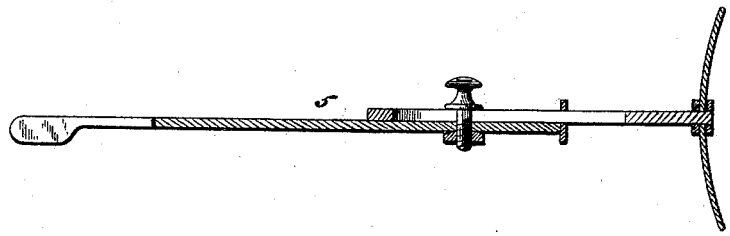

Figure 1 represents a perspective view of an ice-plow constructed in accordance with and embodying my invention. Fig. 2 represents a sectional view of the guide or marker. Fig. 3 represents a perspective view of a modified form of the ice-plow. Fig. 4 represents a sectional view of the modified form of guide or marker.

Referring by numerals to the accompanying drawings, in which similar numerals of reference denote corresponding parts in the several views, the numeral 1 designates the handles of the plow; 2, the horizontally-disposed frame; 3, the cutters; 4, the teeth inserted and secured therein; 5, the adjustable marker hinged or pivoted to the frame, and 6 the handle or lever for throwing the guide to opposite sides of the cutter, all as clearly shown.

The cutters or blades are made of thin metal and are provided with kerfs or recesses 7, in which are secured the teeth 4, such cutters and teeth forming the subject-matter of a separate application filed of even date herewith. The cutters are provided with the front clearing blade or tooth, as usual.

The front end of the frame is provided with lugs 9, having bolt-openings therein, and pivoted to said frame is the angle-arm 10, having the perforated lugs 11, to which the draft-animal is attached, and having the vertical arm thereof provided with a series of perforations 12, by which said arm is adjusted in the lugs 9 of the frame. This device forms a clevis by which the draft is regulated on the cutters, according to the hardness or softness of the ice.

The marker consists of the parallel transverse tubes or bars 13, having their inner ends pivoted to lugs on the frame, and which are connected and braced by the parallel longitudinal bars 14 and the inclined bar 15. The guide proper 16 is formed with or provided with rods 17, which are adjustable laterally in the transverse tubes or bars 13, and are retained at the proper place by set clamping-screws 18, carried by said tubes or bars 13. From this construction it will be seen that the marker can be adjusted in a rapid and easy manner to mark the blocks of ice to any desired size.

To retain the marker proper at a certain point, I provide the rod 19, one end of which is pivoted to one of the brace-bars 14 and the other end is formed with a hook 20 for engaging an opening in the marker or a suitable keeper, and to retain said rod when not in use I employ the sliding ring 21, which holds said rod in line with the bar 14.

The manner of using my improved plow is so obviously apparent that a description thereof is not deemed necessary; but I will call attention to the following advantages which my improved plow possesses: The draft on the cutters can be adjusted to suit the thickness or hardness of the ice, and hence render the cutting easier and more effective. The cutters are made stronger and rendered more efficient by providing them each with a series of teeth. The marker can be readily adjusted to either side of the plow to mark the ice off into blocks of any preferred and desired size. The parts of the plow are very strong and durable and are light, so as to make the draft easy, are not likely to get out of order, and the plow can be manufactured at a low figure.

I would have it understood that I reserve the right to make minor changes in the form and construction of parts without departing from the scope of my invention or sacrificing any of the advantages thereof.

I claim as my invention—

1. In an ice plow or cutter, the combination, with the frame, of the transverse bars or tubes, the longitudinal and inclined brace-bars, the marker having the rods adjustable with relation to the said bars or tubes, the pivoted rod for engaging the marker proper to retain the same at a desired point, and the handle or lever for throwing the marker to opposite sides of the frame.

2. In an ice plow or cutter, the combination, with the frame having the perforated lugs at the front end, of the bar having the lugs at its inner end pivoted to the frame and the arm at its front end provided with a series of openings to receive a bolt or pin and lugs on its upper side for attachment of the draft-animal, substantially as described.

In testimony whereof I affix my signature in presence of two witnesses.

HENRY BODENSTEIN.

Witnesses:
C. H. PIER,
WM. CLARKE.